Feb. 24, 1959 A. W. SEYFRIED Re. 24,607

FLEXIBLE COUPLING MEANS FOR SEPARABLE SHAFTS

Original Filed Oct. 16, 1952 3 Sheets-Sheet 1

INVENTOR.
Arthur W. Seyfried
BY Bertha L. MacGregor
ATTORNEY

FLEXIBLE COUPLING MEANS FOR SEPARABLE SHAFTS

Original Filed Oct. 16, 1952 3 Sheets-Sheet 2

INVENTOR.
Arthur W. Seyfried
BY Bertha L. MacGregor
ATTORNEY

FLEXIBLE COUPLING MEANS FOR SEPARABLE SHAFTS

Original Filed Oct. 16, 1952 3 Sheets-Sheet 3

INVENTOR.
Arthur W. Seyfried
BY Bertha L. MacGregor
ATTORNEY

United States Patent Office

Re. 24,607
Reissued Feb. 24, 1959

24,607

FLEXIBLE COUPLING MEANS FOR SEPARABLE SHAFTS

Arthur W. Seyfried, Racine, Wis., assignor to Scovill Manufacturing Company, Waterbury, Conn., a corporation of Connecticut Original No. 2,755,900, dated July 24, 1956, Serial No. 315,048, October 16, 1952. Application for reissue November 27, 1957, Serial No. 700,928

14 Claims. (Cl. 192—55)

Matter enclosed in heavy brackets [ ] appears in the original patent but forms no part of this reissue specification; matter printed in italics indicates the additions made by reissue.

This invention relates to flexible coupling means and particularly to flexible coupling means for operatively connecting the armature and agitator shafts of motor driven disintegrating food mixers also known as blenders or liquidizers.

The essential parts of a disintegrating mixer of the kind described herein comprise (1) a closed top, open bottom container for the food to be disintegrated or blended, (2) a closure member for said open bottom, which closure member preferably is integral with a shaft bearing in which is mounted an agitator shaft having an agitator on its upper end and a drive coupling member on its lower end, and (3) a power unit which consists of the motor, motor housing and a drive coupling member on the armature shaft adapted to cooperate with the coupling member on the agitator shaft when the parts have been assembled in operative relationship. The power unit as a whole serves as the base of the mixer and has means on its upper surface for supporting the container and closure member and centering them to facilitate engagement of the coupling members.

An important object of the invention is to provide flexible coupling means whereby self-finding driving engagement is established automatically between the respective coupling members on the armature and agitator shafts when the container, with its closure member and agitator unit, are positioned on the power unit base. The coupling herein shown and described avoids numerous objections inherent in prior art couplings which are metallic and non-flexible and require positive finding of the engaging positions of the rigid parts constituting the coupling, with resultant wear of the parts, and which when engaged create vibration transmitted through the coupling members to their respective shafts, bushings, bearings and other parts of the machine.

The vibration inherent in metallic drive couplings destroys the proper fitting of the agitator shaft in its bearing, resulting in leakage of the container contents and gumming of the shaft and its bushing. Comparative tests conducted by me showed the following results: A currently popular liquidizer, which employs a non-flexible metallic drive coupling between its armature and agitator shafts, showed leakage of the container contents (water) after less than four hours operation, whereas the mixer herein shown and described, equipped with my flexible coupling members between the armature and agitator shafts, was operated for more than one hundred hours under water load without leakage of the container contents.

Perfect alignment of the drive and driven shafts is rarely attained in the placement of the container and its closure on the base. The resultant misalignment of the shafts may be lateral, axial or angular. Such misalignment aggravates the vibration inherent in metallic couplings and, in the operation of the mixer, the effect may be likened to repeated hammer blows on the agitator shaft. This results in making the shaft bearing bell-mouthed at top and bottom and pinching the shaft in its bushing between said distorted bearing ends. The misalignment also results in faulty engagement of the coupling members with resultant noise and undue wear of the parts.

All these faults have been overcome by the use of the flexible coupling of my invention. This coupling enables me to use a long bearing in which the agitator shaft rotates without distortion of the bearing. The coupling automatically compensates for misalignment of the shafts, is quiet in operation and free from vibration.

These desirable results are attained by vulcanizing a plurality of specially formed teeth made of rubber to one face of a solid brass or brass-plated steel plate. Preferably the rubber teeth are formed integrally with each other, and are of automobile tire tread hardness. The teeth are shaped to provide maximum contact face area between pairs of cooperating teeth, and they resist distortion in operation as the result of centrifugal force. Each tooth is provided with a thickened base which provides the required support for the tooth as well as bulk of flexible material for a firm and durable connection between the teeth and plate. Details of construction of the coupling members will be understood from the drawing and following specification.

Although some examples of flexible couplings may be found in the prior art, their construction and form are not suitable for efficient operation in the transmission of rotary motion from separable drive to driven shafts.

Another advantage of my invention is the provision of a container rest on the upper surface of the power unit or base of the machine which efficiently supports the container and its closure and permits the container and closure to be placed in position speedily and easily.

Other objects and advantages will appear from the following specification.

Figure 1:
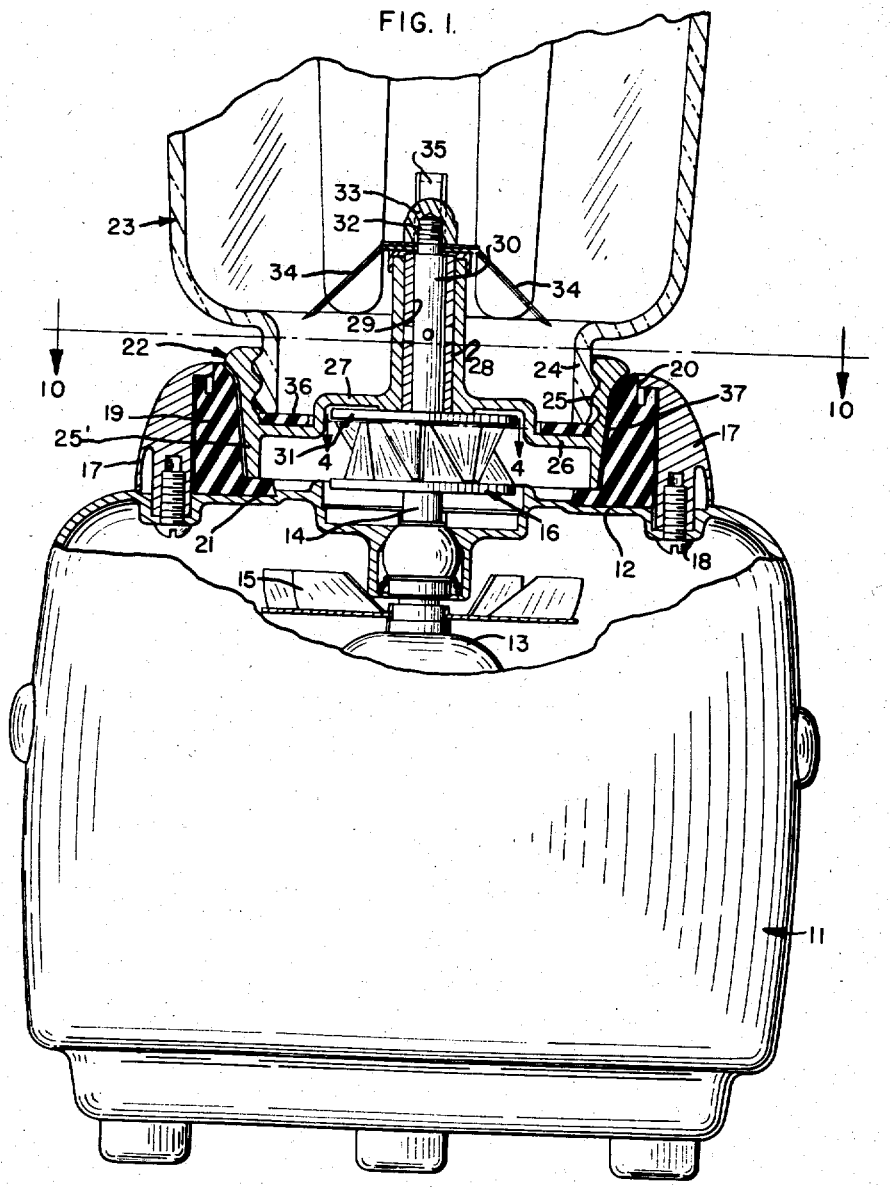
Fig. 1 is a front elevational view, partly in vertical section, of a disintegrating food mixer embodying my invention.

In the preferred embodiment of my invention shown in the drawings, and referring particularly to Fig. 1, the mixer comprises a power unit which constitutes the base of the machine and includes a motor housing 11 having a flat top 12, enclosing the motor partly shown at 13. The armature shaft 14 carries the fan 15, and a flexible drive coupling member 16, the latter being mounted externally of the housing 11 on the upper end of the armature shaft to rotate therewith.

On the upper surface 12 of the power unit housing 11 are four members which receive and support the combined container closure and agitator unit. The four supporting members are spaced 90 degrees apart, and each comprises a bracket 17 secured to the housing wall 12 by a screw 18. On the inner side of the bracket 17 is a container closure rest 19 preferably made of resilient material such as rubber. Said closure rest 19 is retained by an inturned upper portion 20 on the bracket 17, and at its bottom the rest is extended inwardly radially as indicated at 21 to provide a seat for the container closure member indicated as a whole at 22 and hereinafter described in detail.

The container 23 for holding the food to be disintegrated or blended may be a conventional jar, round in cross section, closed at one end and having a screw threaded neck at its opposite open end. I prefer to use a container having a body portion elliptical in cross section and a round, screw threaded neck 24 surrounding its bottom open end, adapted for engagement with the internally screw threaded portion 25 of the closure member 22.

The combined container closure and agitator unit 22 comprises said screw threaded portion 25, closure base 26 annular in form, integral with the threaded portion 25, and offset on its inner circumferential edge to form a raised concentric portion 27 which merges with the sleeve shaped bearing 28 rising from said concentric portion 27. Within the bearing 28 is a bushing 29 for reception of the agitator shaft 30. The container closure member extends downwardly from the threaded portion 25 below the base portion 26 and rests on the base extension 21 of the container rest 19 as indicated at 25. This arrangement provides a recess below the part 27 of the container closure for accommodating a drive coupling member indicated as a whole at 31, mounted on the lower end of the agitator shaft 30, for separably meshing with the coupling member 16 on the armature shaft.

The upper end of the agitator shaft is screw threaded at 32 and retained in the bearing 28 by a hex nut 33. A pair of agitator blade members are mounted on the shaft 30 to rotate therewith. Preferably two downturned blades 34 extend in opposite directions from an apertured flat cross piece mounted on the agitator shaft, and two upturned blades 35 similarly extend in opposite directions from an apertured cross piece mounted on the agitator shaft at right angles to the first mentioned blade member and fixed on the shaft between the top of the bearing 28 and the nut 33. These blades preferably extend at an angle of 40 to 45 degrees, and are non-tracking. The blades are flat, not pitched, and sharpened along their longitudinal edges, knife-like. The upturned blades operate within the elliptical portion of the container and the lower ends of the downturned blades terminate slightly above the threaded neck portion of the container. The ends of the blades preferably are beveled, and though shown as straight across their free ends, they may be rounded or tapered.

After food to be treated has been placed in the container 23, the container closure member with its agitator unit is secured to the container by engagement between the threaded portions 25 and 24, respectively. A resilient annular gasket 36 rests on the closure base portion 26 between said part 26 and the edge of the threaded neck of the container, forming a tight seal for the container when the closure member 22 has been applied thereto. The container 23 and its closure member 22 are positioned on the base 11 between the four container rests 19, and rotative movement of the container and its closure is resisted by the contour of the peripheral surface 37 of the closure member. This surface 37 is provided with a series of curved depressions 38 separated by vertically extending ribs 39. When the container and its closure are positioned on the mixer base, between the container rests 19, the depressed surfaces 38 naturally are engaged by the inner faces of the rests 19, and the vertical ribs 39 resist rotative movement of the container relatively to said rests.

The agitator blades rotate in the direction in which the container is rotated relatively to its closure, and this tightens the closure on the container and prevents relative movement in the opposite direction between said parts during the operation of the mixer.

Referring to Figs. 2 to 9, inclusive, illustrating the flexible coupling members indicated as a whole at 16 and 31 (Fig. 1), it will be understood that these members are identical but one is mounted on the armature shaft with its teeth upwardly directed and the other is mounted on the agitator shaft with its teeth directed downwardly, engaging each other when the parts are in operative position as shown in Fig. 1.

Figure 2:
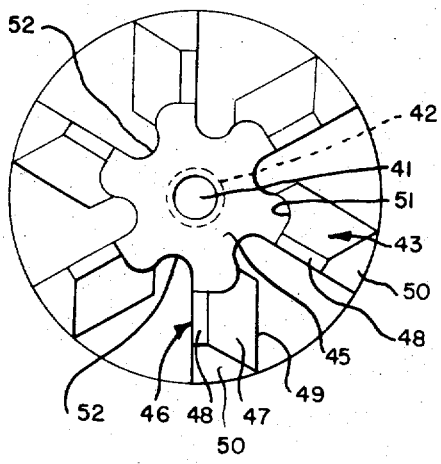
Fig. 2 is a plan view, on an enlarged scale, of one of the two flexible drive coupling members of the mixer.
Figure 3:
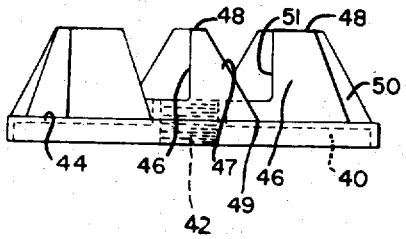
Fig. 3 is a side elevational view, also on an enlarged scale, of the coupling member of Fig. 2.

One of the two coupling members will be described with special reference to Figs. 2 and 3. It comprises a brass plated steel or solid brass plate 40, centrally apertured at 41 and screw threaded as indicated at 42. A plurality of flexible teeth 43, preferably six in number, project in circumferentially spaced relationship from one face of a disc 44 of the same flexible material, preferably integral therewith. The preferred material from which the teeth and disc are formed is rubber of the hardness of automobile tire treads. The disc 44 is relatively thin in the circumferential region between the teeth 43 but is thickened in the central area 45 surrounding an opening which registers with the plate opening 41. The flat face of the resilient disc 44 is vulcanized to the metal plate 40 and the resilient material of the disc also coats the circumferential edge of the plate 40. The toothed disc and the plate when thus connected constitute an integral base and support for the flexible teeth 43.

Each tooth has a contact face 46 which extends radially with respect to the axis of the coupling member, and is flat in a vertical plane perpendicular to the disc 44, from its root or junction with said disc 44 to its free edge or tip. Opposite its contact face 46, said tooth has an inclined surface 47 which slopes from the narrow flat tip 48 to the tooth root where it joins the disc 44 along a line 49 parallel to the face 46. The tooth 43, therefore, has substantial thickness between the contact face 46 and the opposite inclined surface 47 in the base portion where it joins the disc 44. This thickness is evident in the form of the outer beveled circumferential face 50 which joins said opposite surfaces 46 and 47 as well as the base or disc 44 and the tip surface 48 of the tooth. The said circumferential face 50 coincides with the periphery of the disc 44 at the root of the tooth but is inclined inwardly toward its junction with the tip surface 48. The inner side 51 of the tooth 43 merges with the central thickened portion 45 of the disc 44.

The said thickened portion 45 is curved or cut away between the teeth as indicated at 52 for the purpose of accommodating the teeth 43 of the cooperating coupling member when the respective shafts on which they are mounted are not aligned.

While six teeth have been shown as the preferred construction of the coupling member 16 and 31, the number may be varied.

Preferably the coupling members 16 and 31 are mounted on their respective shafts by means of the screw threads 42 on the metal portion of each of the coupling members, engaging screw threads on said shafts 14 and 30.

Figure 4:
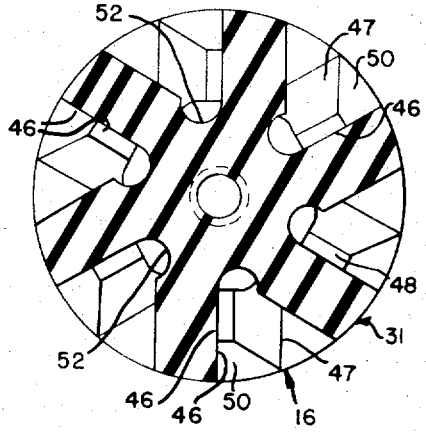
Fig. 4 is a horizontal sectional view, on an enlarged scale, taken in the plane of the line 4—4 of Fig. 1, looking downwardly as indicated by the arrows, showing the flexible coupling members as they appear when the armature and agitator shafts are aligned.

As shown in Figs. 1 and 4, when the armature shaft 14 and agitator shaft 30 are in alignment, the teeth of the coupling members 16 and 31 engage each other in such manner that the contact faces 46 of the teeth of one member have maximum contacting engagement with the faces 46 of the teeth of the other member, and corresponding parts of the said members register with each other circumferentially and annularly.

Figure 5:
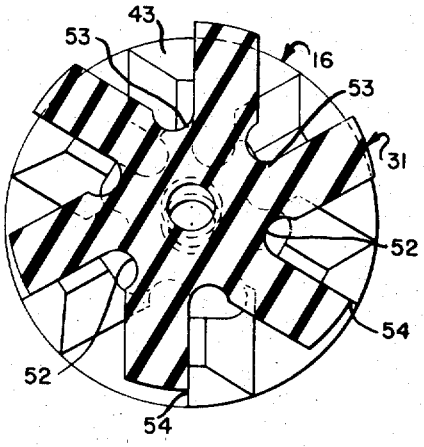
Fig. 5 is a view similar to Fig. 4 but showing the same parts as they appear when said shafts are laterally misaligned.
Figure 10:
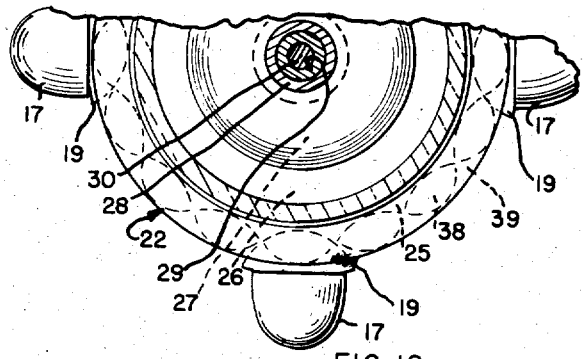
Fig. 10 is a horizontal sectional view showing the container and container closure seated on the supporting means, the section being taken in the plane of the line 10—10 of Fig. 1.
Figure 6:
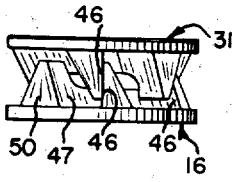
Fig. 6 is a side elevational view showing the drive coupling members as they appear when their respective shafts are misaligned axially, that is, angularly.

In Fig. 5, the said coupling members 16 and 31 are shown as they would appear in a sectional view taken in the plane of the line 4—4 of Fig. 1, but modified by assuming the shafts 14 and 30 to be laterally misaligned, though parallel. In this position, part of the contact faces 46 of some of the teeth of one coupling member are not in contact with the contact faces 46 of cooperating teeth on the other, but extend into the space afforded by the cut away central portion 52 of the resilient disc 44, as indicated at 53 near the top of Fig. 5. Other of said teeth also are partly out of contacting engagement with teeth on the other coupling member to the extent that they project circumferentially beyond the cooperating teeth as indicated at 54. In the rotation of the shafts and their coupling members the teeth successively occupy the positions indicated in Fig. 5, when the shafts are misaligned laterally.

Notwithstanding the misalignment described and the fact that the contact faces 46 of cooperating teeth do not register to as full an extent as they do when the shafts are perfectly aligned, efficient driving engagement is insured because of the form of the ample contacting faces and their capacity for adjusting themselves to the misalignment.

Figure 7:
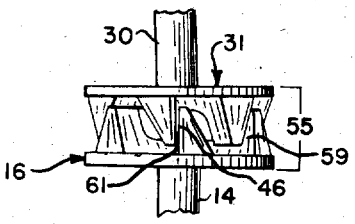
Fig. 7 is a view similar to Fig. 6, showing the same parts as viewed at 90 degrees to the position shown in Fig. 6 with the shafts in the same misaligned positions.
Figure 9:
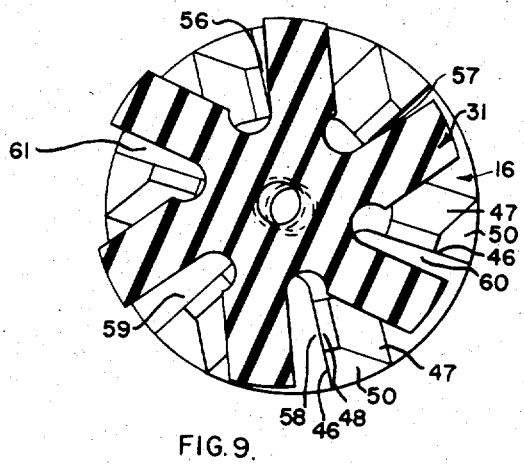
Fig. 9 is a horizontal sectional view, on an enlarged scale, taken in the plane of the line 9—9 of Fig. 8, looking downwardly as indicated by the arrows.
Figure 8:
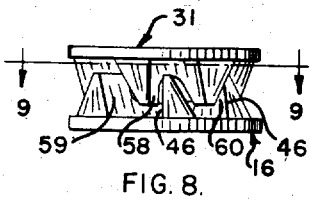
Fig. 8 is a view similar to Fig. 6 showing the same parts as they appear from the side opposite that shown in Fig. 6.

When the shaft misalignment is axial, that is when the shafts 14 and 30 extend at an angle to each other, as shown in Figs. 6 to 9, inclusive, the contacting engagement of the faces 46 of the teeth 43 of the coupling members varies both radially and axially as the result of the divergent planes in which the respective coupling members are positioned relatively to each other. This is best shown in Fig. 7 where it is apparent that the distance indicated at 55 between the discs 44 at the right of the figure is greater than said distance at the opposite side. Therefore the faces 46 of some of the teeth of cooperating pairs of teeth are opposed by only a portion of the faces 46 of the cooperating teeth, and, due to the non-parallel relationship of the discs 44, only some of the faces 46 are in driving contact with each other. This is illustrated in Fig. 9, where two pairs of cooperating teeth are in nearly normal driving engagement as indicated at 56 and 57, while two pairs of cooperating teeth at the opposite side of the clutch have their faces 46 spaced apart and are out of driving engagement, as indicated at 58 and 59. The remaining pairs of cooperating teeth are also out of driving engagement although spaced apart to a lesser degree, as indicated at 60 and 61.

Fig. 9 illustrates an extreme condition of angular misalignment but even so, one or more pairs of the teeth of respective coupling members successively make driving contact between their faces 46 during the rotation of the shaft members, and provide efficient transmission of rotary motion from the drive to the driven shaft without wear and without noise and vibration. It will be understood that when the coupling member 16 is rotated by the drive shaft 14, the teeth on said drive coupling automatically adjust themselves to make contact with the cooperating faces of teeth on the driven coupling member 31, and this is possible because of the flexible qualities of the teeth. As explained in connection with Fig. 9, even when the shafts are misaligned to as great a degree as is possible in the placement of the container and its closure on the base, one or more pairs of cooperating teeth successively make driving contact and their faces 46 bear against each other in substantially parallel relationship so as to close the spaces indicated at 56 and 57.

Mixers of the kind described are driven at 12,000 R. P. M. and at this speed the centrifugal force is sufficient to distort flexible teeth and to cause them to project radially beyond the circumference of the disc 44. I have avoided such action by making the teeth 43 of substantial thickness, and by sloping the wall 50 inwardly from the root of the teeth to their tips 48. This construction resists centrifugal force, and at no time do the teeth 43 extend beyond the circumference of the disc 44.

Changes may be made in details of construction and form of some of the parts without departing from the scope of my invention as set forth in the appended claims.

I claim:

1. Flexible coupling means for drivingly connecting a pair of separable shafts, comprising a coupling member fixed on each of said shafts, each of said coupling members comprising a rigid disc, a flexible disc having one of its faces securely joined to one face of the rigid disc and a plurality of flexible teeth on the exposed face of said flexible disc, each of said teeth having a contact face perpendicular to the said disc and extending radially with respect to the axis of the coupling member but spaced from the axial center of said member, the teeth of each disc being spaced apart circumferentially to receive between them the teeth on the other coupling member when said members are in driving relationship, the perpendicular contact faces of the teeth of one coupling member registering in maximum face area contact with the contact faces of the teeth of the other coupling member when said shafts are in alignment.

2. Flexible coupling means for drivingly connecting a pair of separable shafts, comprising a coupling member fixed on each of said shafts, each of said coupling members comprising a rigid support having a face at right angles to the axis of its shaft, a plurality of flexible teeth on said support, each of said teeth having a contact face perpendicular to the face of the support and extending radially with respect to the axis of the coupling member but spaced from the axial center of said member, each tooth having a circumferential surface sloped inwardly from the periphery of the support to the tip of the tooth and an inclined surface opposite its perpendicular contact face, the teeth of each coupling member being spaced apart circumferentially to receive between them the teeth on the other coupling member, the said contact faces of each of said members facing each other when said coupling members are in driving relationship.

3. Flexible coupling means for drivingly connecting a pair of separable shafts, comprising a coupling member fixed on each of said shafts, each of said coupling members comprising a rigid support having a face at right angles to the axis of its shaft, a plurality of flexible teeth on said support, each of said teeth having a contact face perpendicular to the face of the support and extending radially with respect to the axis of the coupling member but spaced from the axial center of said member, each tooth being of substantial thickness radially and circumferentially, and having a surface sloped inwardly from the periphery of the support to the tip of the tooth and an inclined surface opposite its perpendicular contact face, the teeth of each coupling member being spaced apart circumferentially to receive between them the teeth on the other coupling member, the said contact faces of each of said members facing each other when said coupling members are in driving relationship, the contact faces of the teeth of one coupling member registering in maximum face area contact with the contact faces of the teeth of the other coupling member when said shafts are in alignment.

4. Flexible coupling means for drivingly connecting a pair of separable shafts, comprising a coupling member fixed on each of said shafts, each of said coupling members comprising a metal disc, a flexible disc having one of its faces securely joined to one face of the metal disc, and a plurality of flexible teeth integral with the flexible disc on the exposed face thereof, each of said teeth having a contact face perpendicular to the said disc and extending radially with respect to the axis of the coupling member but spaced from the axial center of said member, each tooth being of substantial thickness both radially and circumferentially and having a circumferential surface sloped inwardly from the periphery of the disc to the tip of the tooth and an inclined surface opposite its contact face, the teeth of each member being spaced apart circumferentially to receive between them the teeth on the other coupling member when said members are in driving relationship, the perpendicular contact faces of the teeth of one member registering in maximum face area contact with the contact faces of the teeth of the other member when said shafts are in alignment.

5. Flexible coupling means for drivingly connecting a pair of separable shafts, comprising a coupling member fixed on each of said shafts, each of said coupling members comprising a metal disc, a rubber disc having one of its faces vulcanized to one face of the metal disc, a thickened central portion and a plurality of flexible teeth integral with the rubber disc on the exposed face thereof, each of said teeth having a contact face perpendicular to the said rubber disc and extending radially with respect to the axis of the coupling member between said thickened central portion and the periphery of the rubber disc, each tooth being of substantial thickness both radially and circumferentially and having a circumferential surface sloped inwardly from the periphery of the disc to the tip of the tooth and an inclined surface opposite its contact face, the teeth of each member being spaced apart circumferentially to receive between them the teeth on the other coupling member when said members are in driving relationship, the perpendicular contact faces of the teeth of one member registering in maximum face area contact with the contact faces of the teeth of the other member when said shafts are in alignment.

6. Flexible coupling means for drivingly connecting a pair of separable shafts each having screw threaded free ends, comprising a coupling member mounted on each of said shafts, each of said coupling members comprising a metal disc centrally apertured and screw threaded for engaging the threads on the shaft end, a flexible disc having one of its faces securely joined to one face of the metal disc, and a plurality of flexible teeth integral with the flexible disc on the exposed face thereof, each of said teeth having a contact face perpendicular to the said disc end and extending radially with respect to the axis of the coupling member but spaced from the axial center of said member, each tooth being of substantial thickness both radially and circumferentially and have a circumferential surface sloped inwardly from the periphery of the disc to the tip of the tooth and an inclined surface opposite its contact face, the teeth of each member being spaced apart circumferentially to receive between them the teeth on the other coupling member when said members are in driving relationship, the perpendicular contact faces of the teeth of one member registering in maximum face area contact with the contact faces of the teeth of the other member when said shafts are in alignment.

7. Flexible coupling means for drivingly connecting a pair of separable shafts, comprising a coupling member fixed on each of said shafts, each coupling member comprising a rigid disc, a resilient disc having one face securely joined to one face of the rigid disc, and a plurality of flexible teeth integral with the exposed face of said resilient disc, said teeth having contact faces perpendicular to said disc face, extending radially but spaced from the center of the disc, each tooth having an inclined surface opposite the perpendicular contact face, said inclined surface being joined to the resilient disc in a line parallel to the contact face of the tooth, a circumferential face on each tooth which coincides with the periphery of the resilient disc at the tooth root, the resilient disc being thickened in the central portion and relatively thin between said teeth, the inner annular surface of each tooth merging with the thickened central portion of the resilient disc which is cut away circumferentially between the merged inner annular surfaces of the teeth.

8. The coupling defined by claim 7 in which the resilient disc is vulcanized to the rigid disc and extends over the peripheral edge of said rigid disc.

*9. In combination with a pair of separable shafts which are longitudinally and laterally movable relatively to each other, coupling means for drivingly connecting said shafts including a flexible coupling member fixed on one of said shafts comprising a rigid disc, a flexible disc having one of its faces securely joined to one face of the rigid disc and a plurality of flexible teeth on the exposed face of said flexible disc, each of said teeth having a contact face perpendicular to the said disc and extending radially with respect to the axis of the coupling member but spaced from the axial center of said member, the teeth being spaced apart circumferentially.*

*10. In combination with a pair of separable shafts which are longitudinally and laterally movable relatively to each other, coupling means for drivingly connecting said shafts including a flexible coupling member fixed on one of said shafts comprising a rigid support having a face at right angles to the axis of the shaft and a plurality of flexible teeth on said support, each of said teeth having a contact face perpendicular to the face of the support and extending radially with respect to the axis of the coupling member but spaced from the axial center of said member, each tooth having a circumferential surface sloped inwardly from the periphery of the support to the tip of the tooth and an inclined surface opposite its perpendicular contact face, the teeth being spaced apart circumferentially.*

*11. In combination with a pair of separable shafts which are longitudinally and laterally movable relatively to each other, coupling means for drivingly connecting said shafts including a flexible coupling member fixed on one of said shafts comprising a rigid support having a face at right angles to the axis of the shaft, and a plurality of flexible teeth on said support, each of said teeth having a contact face perpendicular to the face of the support and extending radially with respect to the axis of the coupling member but spaced from the axial center of said member, each tooth being of substantial thickness radially and circumferentially, and having a surface sloped inwardly from the periphery of the support to the tip of the tooth and an inclined surface opposite its perpendicular contact face, the teeth being spaced apart circumferentially.*

*12. In combination with a pair of separable shafts which are longitudinally and laterally movable relatively to each other, coupling means for drivingly connecting said shafts including a flexible coupling member fixed on one of said shafts comprising a centrally apertured rigid disc, a centrally apertured flexible rubber disc having one of its faces vulcanized to one face of the rigid disc, a thickened central portion surrounding said central aperture and a plurality of flexible teeth integral with the rubber disc on the exposed face thereof, each of said teeth having a contact face perpendicular to the said rubber disc and extending radially with respect to the axis of the coupling member between said thickened central portion and the periphery of the rubber disc, each tooth being of substantial thickness both radially and circumferentially and having a circumferential surface sloped inwardly from the periphery of the disc to the tip of the tooth and an inclined surface opposite its contact face.*

*13. In combination with a pair of separable shafts which are longitudinally and laterally movable relatively to each other, at least one of which has a screw threaded free end, coupling means for drivingly connecting said shafts including a flexible coupling member mounted on one of said shafts comprising a rigid disc centrally aper-*

*tured and screw threaded for engaging the threads on a shaft end, a flexible disc having one of its faces securely joined to one face of the rigid disc and a plurality of flexible teeth integral with the flexible disc on the exposed face thereof, each of said teeth having a contact face perpendicular to the said disc and extending radially with respect to the axis of the coupling member but spaced from the axial center of the member, each tooth being of substantial thickness radially and circumferentially and having a circumferential surface sloped inwardly from the periphery of the disc to the tip of the tooth and an inclined surface opposite its contact face.*

*14. In combination with a pair of separable shafts which are longitudinally and laterally movable relatively to each other, coupling means for drivingly connecting said shafts including a flexible coupling member fixed on one of said shafts comprising a rigid disc, a flexible disc having one of its faces securely joined to one face of the rigid disc and a plurality of flexible teeth on the exposed face of said flexible disc, each of said teeth having a contact face perpendicular to the said disc and extending radially with respect to the axis of the coupling member but spaced from the axial center of said member, the teeth being spaced apart circumferentially, and each tooth having an inclined surface opposite its perpendicular contact face, said inclined surface being joined to the flexible disc in a line parallel to the contact face, a circumferential face on each tooth which coincides with the periphery of the flexible disc at the tooth root, the flexible disc being thickened in the central portion and relatively thin between said teeth, the annular surface of each tooth merging with the thickened central portion of the flexible disc which is cut away circumferentially between the merged inner annular surfaces of the teeth.*

References Cited in the file of this patent or the original patent

UNITED STATES PATENTS

| | | |
|---|---|---|
| 1,919,998 | Blume | July 25, 1933 |
| 2,083,037 | Schmittgen | June 8, 1937 |
| 2,109,501 | Osius | Mar. 1, 1938 |
| 2,278,125 | Landgraf | Mar. 31, 1942 |
| 2,309,347 | Landgraf | Jan. 26, 1943 |
| 2,512,407 | Wood | June 20, 1950 |
| 2,585,255 | Kochner et al. | Feb. 12, 1952 |
| 2,700,443 | Boice | Jan. 25, 1955 |
| 2,742,127 | Mumford et al. | Apr. 17, 1956 |